United States Patent [19]
Goodwin

[11] Patent Number: 5,460,721
[45] Date of Patent: Oct. 24, 1995

[54] HELICAL WOUND TUBE

[76] Inventor: William R. Goodwin, 1425 Northbrook, Ann Arbor, Mich. 48103

[21] Appl. No.: 987,839

[22] Filed: Dec. 9, 1992

[51] Int. Cl.[6] .................................................. B01D 27/06
[52] U.S. Cl. .................... 210/494.1; 210/497.1; 210/497.2; 493/299; 493/941; 156/190; 156/195; 55/520; 55/DIG. 5
[58] Field of Search ................. 210/232, 494.1, 210/494.2, 497.1; 29/163.7; 493/288, 299, 941; 156/184, 193, 195, 190; 55/498, 520, DIG. 5

[56] References Cited

U.S. PATENT DOCUMENTS

| | | | |
|---|---|---|---|
| 1,792,797 | 2/1931 | Armstrong | 210/494.1 |
| 2,070,073 | 2/1937 | Walton | 210/494.1 |
| 2,115,577 | 4/1938 | Goldman | 210/494.1 |
| 2,354,481 | 7/1944 | Russell | 210/169 |
| 2,549,363 | 4/1951 | Blickman | 210/494.1 |
| 3,769,128 | 10/1973 | Manjikian | 156/195 |
| 4,101,423 | 7/1978 | Merrill et al. | 210/494.1 |
| 4,717,374 | 1/1988 | Elias | 493/292 |
| 4,760,949 | 8/1988 | Elias | 229/4.5 |
| 4,863,602 | 9/1989 | Johnson | 210/494.1 |
| 5,001,819 | 3/1991 | Harrop | 29/564 |
| 5,039,413 | 8/1991 | Harwood et al. | 210/497.1 |
| 5,230,726 | 7/1993 | Smith et al. | 55/487 |

*Primary Examiner*—Robert A. Dawson
*Assistant Examiner*—W. L. Walker

[57] ABSTRACT

A helically wound tube made of at least two sheets of preperforated flat roll paper material. Each sheet is helically wound in edge abutting relation such that one longitudinal edge of the sheet abuts the other longitudinal edge of the sheet to form a ridgeless seam. Some of the perforations of the subsequently wound sheets overlap some of the perforations of the previously wound sheets to form a reinforced cylindrical tube having perforations that permit radial flow through the cylindrical tube.

8 Claims, 3 Drawing Sheets

HELICAL WOUND TUBE

TECHNICAL FIELD

This invention relates to a perforated helically wound tube.

BACKGROUND OF THE INVENTION

Helically wound tubes are used in a variety of applications. This invention applies particularly to a filter center tube used in an oil filter for an automobile. Many of these tubes are made of paper sheet material which provides a low cost filter center tube that can be discarded and economically replaced. One problem encountered is how to economically manufacture a helically wound tube with perforations that provide adequate radial flow.

Some current tubes are made of multiple plies of material that are helically wound, trimmed to size, and then perforated. This is an expensive manufacturing process. Another type of filter center tube, as disclosed in U.S. Pat. No. 2,354,481 issued 25 Jul. 1944 to J. K. Russell may use one preperforated sheet that is spirally wound about itself to form a multiple layered tube. A disadvantage of this tube is that a ridged axial edge is formed where the sheet ends. The ridged edge provides an unsmooth outer layer that may wear against the filtering material that encloses the tube.

SUMMARY OF THE INVENTION

This invention provides a filter center tube that is economical to manufacture, while also offering a smooth and durable tube with adequate perforations to provide sufficient radial flow of liquid through the cylindrical tube.

Two sheets of a paper material are perforated and then helically wound to form a tube. Although the type of perforations is not important, it is preferred that the perforations have curved edges, such as circles or ovals. The curved edges help prevent the sheets tearing at the perforations.

The entire area of each sheet may be perforated, but it is preferred to have unperforated portions, so that when wound the unperforated portions will define the ends of the tube. This will add durability for fitting the ends into their appropriate encasements.

The pattern of the perforations on each sheet should encompass 30% to 40% of the perforated portion. Preferably, the patterns on the two sheets will be different from each other to further ensure that some of the perforations of the second sheet overlap some of the perforations of the first sheet.

The first sheet is wound about a mandrel having the desired diameter of the tube. It is wound at such an angle to the mandrel so that the first sheet's longitudinal edges abut to each other and do not overlap, thereby providing a smooth and ridgeless seam.

The angle is determined by the width of the sheet and the inner diameter of the tube such that $$\sin (a) = W/(\pi D)$$

where (a) is the angle, W is the width of the sheet, and D is the inside diameter of the finished tube and the winding diameter of the inner sheet.

The next sheet is wound about the mandrel over the first sheet at an angle so that its longitudinal edges abut to each other and do not overlap. Although the angle of the second sheet may be different than the first sheet, it is advantageous to keep the angles and widths of the sheets the same to avoid stress on the sheets while winding.

The details as well as other features and advantages of the embodiment of this invention are set forth in the remainder of the specification and are shown in the drawings.

THE PREFERRED EMBODIMENT

Testing indicates that a sufficient radial flow is provided if filter center tube is approximately 10% perforated. This invention provides a filter center tube that is 9–16% perforated when two sheets of card stock are used.

Figure 1:
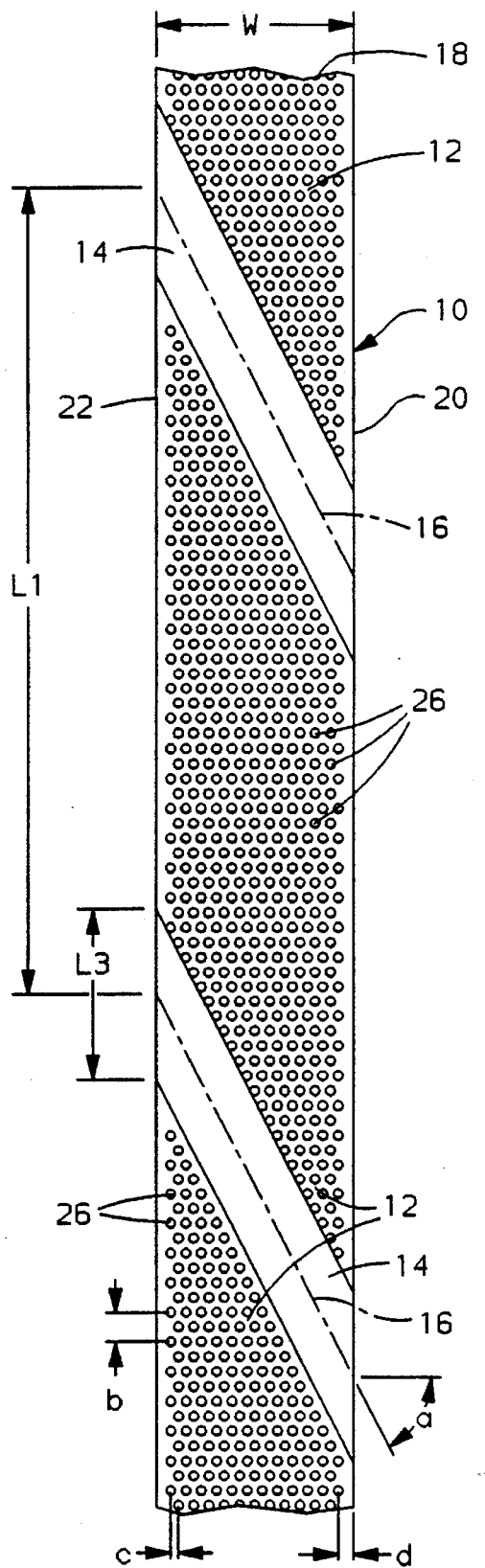
FIG. 1 is a plan view of a partial length of the perforated sheet for the inner layer of the tube before being helically wound.
Figure 3:
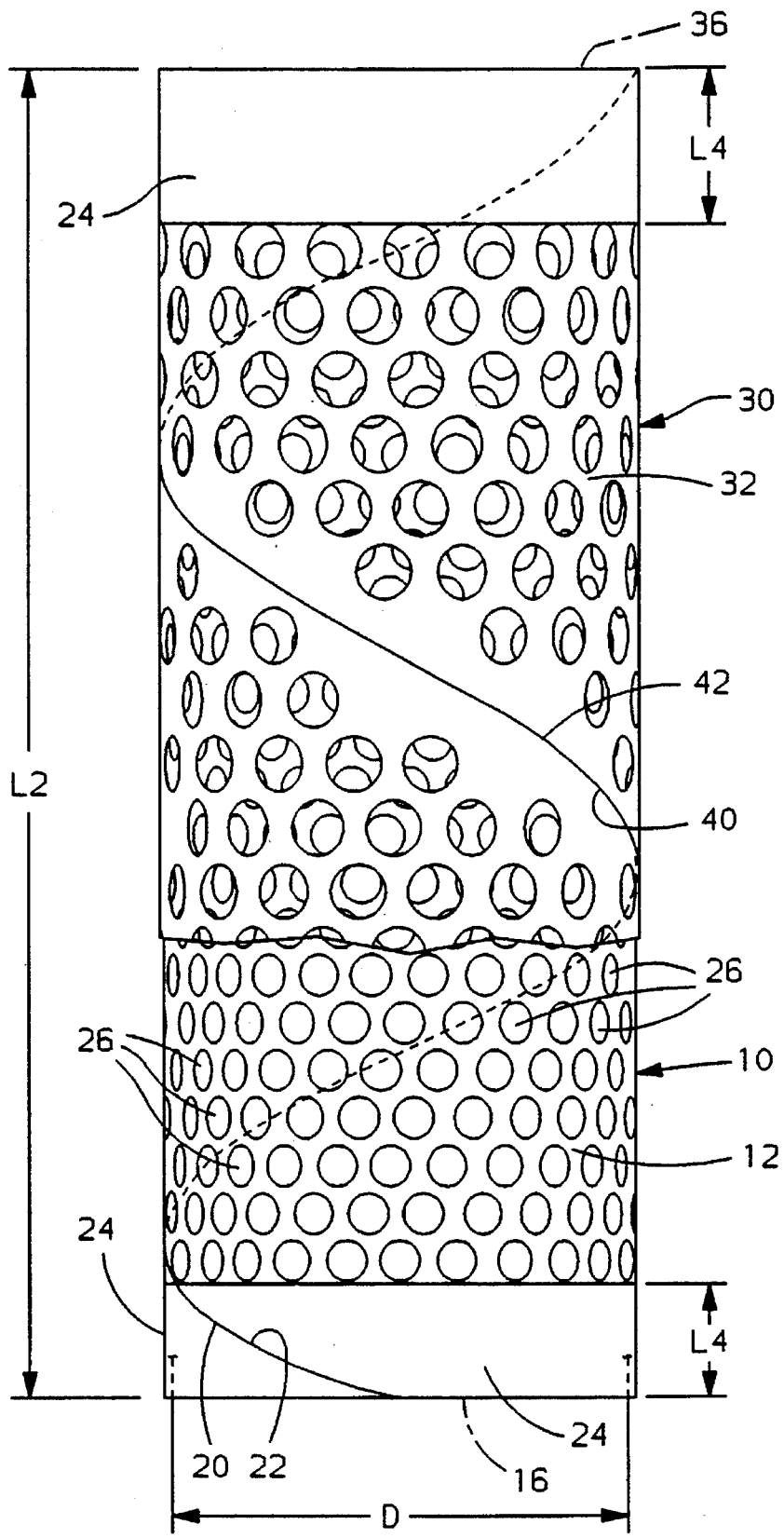
FIG. 3 is a view in elevation, of a tube according to this invention, with a portion of the outer layer broken away to show the inner layer of the tube.

Referring first to FIGS. 1 and 3, a sheet 10 of flat roll material is used to form the inner sheet layer (ply) of the tube and is made of a card stock material approximately 0.020 mm thick. Before perforating the sheet 10, it is treated with a phenolic resin to add strength and to retain its form. A heat actuated or water based adhesive is applied to one side of sheet 10 for bonding the subsequent layer. The sheet 10 is perforated alternatingly providing a perforated portion 12 and an unperforated portion 14. The unperforated portions 14 have center lines 16 that provide the cutting lines to define the top and bottom edges of the finished tubes. The distance from center line 16 to center line 16 is L1 such that $$W(L1) = (\pi D) L2$$

where $(\pi D) L2$ is the surface area of the finished tube, and D is the inner diameter of the finished tube and L2 is the length of the final tube; and where W is the width of the sheet of card stock material used.

The preferred embodiment provides a finished tube having a length (L2) of 100 mm and an inner diameter (D) of 35.0 mm. This can be accomplished by using a sheet having a width (W) of 50.8 mm and a distance (L1) between center lines 16 of 216.45 mm.

The sheet 10 has a leading edge 18 and two longitudinal edges 20 and 22. The unperforated portion 14 is a band 20 mm wide that provides unperforated ends 24 having an axial length (L4) of 10.0 mm. The unperforated portion 14 is located on the sheet 10 at an angle (a) to the leading edge 18. The length (L3) of the unperforated portion 14 along the longitudinal edges 20 and 22 is calculated by the equation:

$$L3 = 2(L4) / \cos (a)$$

where L4 is the length desired for an unperforated end 24. The angle (a) is determined by the equation:

$$W/(\pi D) = \sin (a)$$

where W is the width of the leading edge 18, and D is the inner diameter of the finished tube.

The angle (a) is 62.48 degrees to produce a tube having an inner diameter of 35.0 mm, if the sheet is 50.8 mm wide.

An important consideration is to perforate 30–40% of each perforated portion to yield a tube with 9–16% of the perforations of the two layers overlapping to provide radial flow of fluid through the cylindrical tube.

In the preferred embodiment, the perforations 26 are circular having 3.0 mm diameters. The perforations are situated in closed pack formation, wherein there are lines of perforations parallel to and spaced from the center lines 16; and there are lines of perforations parallel to and spaced from the longitudinal edges 20 and 22. Each center of perforations 26 is spaced (b) 7.50 mm from its adjacent center along the line parallel to the longitudinal edges 20 and 22. In each line of perforations parallel to the center lines 16, the distance (c) from the center of one perforation to its adjacent center and measured along a line parallel to the leading edge 18 is 1.95 mm. The centers of the first parallel line of perforations 26 are spaced (d) 4.0 mm from the longitudinal edges 20 and 22. In the perforated portion 12, approximately 506 perforations with 3.0 mm diameters can be punched to provide approximately 40% perforations of the surface area.

Figure 2:
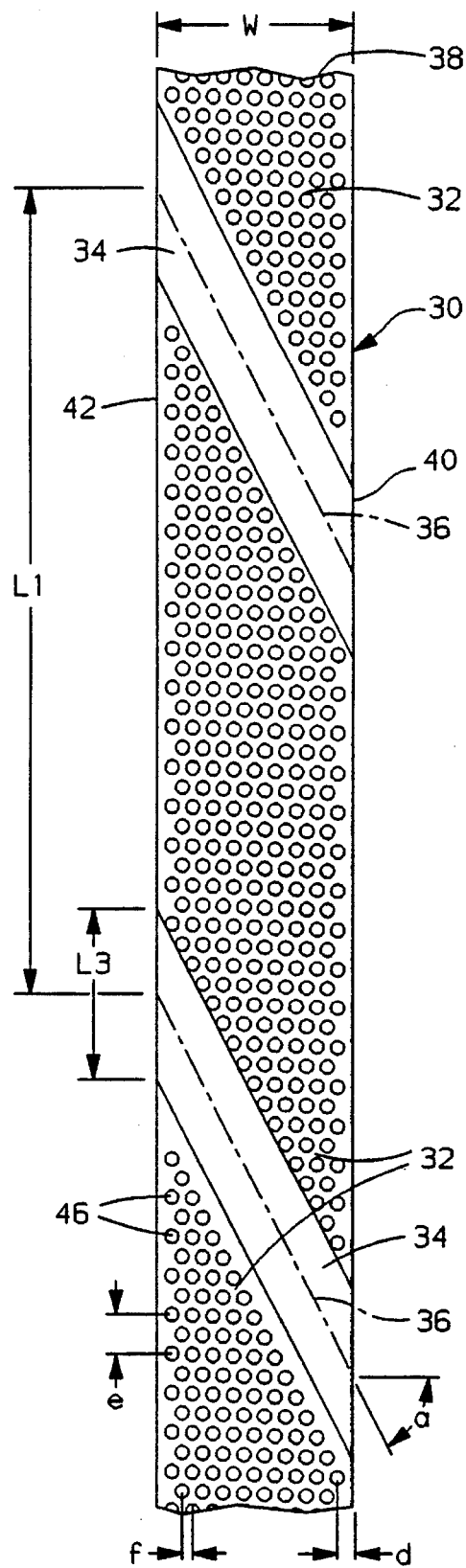
FIG. 2 is a plan view of a partial length of the perforated sheet for the outer layer of the tube before being helically wound.

Referring to FIGS. 2 and 3, an outer sheet 30 is made of 0.020 mm card stock material and is treated with a phenolic resin coating. The outer sheet 30 has one side coated with a heat activated or water based adhesive to bond the outer sheet 30 to the inner sheet 10. The outer sheet 30 can have the same dimensions and perforation configurations as the inner sheet 10. But to ensure an adequate perforation overlap of the two sheets, the preferred embodiment has different perforation size and spacing from the inner sheet 10, but yet still provides a sheet with 40% perforations.

The sheet 30 is perforated alternatingly providing a perforated portion 32 and an unperforated portion 34. The unperforated portions 34 have center lines 36 that provide the cutting lines to define the top and bottom edges of the finished tubes. The distance from center line 36 to center line 36 is L1 such that $$W(L1)=(\pi D)L2$$

where $(\pi D)L2$ is the surface area of the finished tube, and D is the inner diameter of the finished tube and L2 is the length of the final tube; and where W is the width of the sheet of card stock material used. The finished tube will have a length (L2) of 100.0 mm and an inner diameter (D) of 35.0 mm, where the sheet width (W) is 50.8 mm and the distance (L1) between center lines 36 is 216.45 mm.

The sheet 30 has a leading edge 38 and two longitudinal edges 40 and 42. The unperforated portion 34 is a band 20 mm wide that provides unperforated ends 24 having an axial length (L4) 10.0 mm. The unperforated portion 34 is located on the sheet 30 at an angle (a) to the leading edge 38. The length (L3) of the unperforated portion 34 along the longitudinal edges 40 and 42 is calculated by the equation:

$$L3=2(L4)/\cos(a)$$

where L4 is the length desired for an unperforated end 24. The angle (a) is determined by the equation:

$$W/(\pi D)=\sin(a)$$

where W is the width of the leading edge 38, and D is the inner diameter of the finished tube. The angle (a) is 62.48 degrees to produce a tube having an inner diameter of 35.0 mm, if the sheet is 50.8 mm wide.

If the thickness of the inner layer of paper or card stock material significantly increases the winding diameter of the outer layer from that of the inner layer (D), adjustments may be required to the width (W) of the leading edge 38 and the distance (L1) between center lines 36 of the outer sheet. This results because the winding diameter (D1) of the outer layer is $$D1=D+2t$$

where (t) is the thickness of the inner layer and (D) is the inner diameter of the tube. These adjustments may be necessary to ensure alignment of the inner and outer layers. Or, as an alternative to adjusting the dimensions of the outer sheet, the winding angle (a) can be periodically adjusted during the winding process to maintain the alignment of the layers.

In the preferred embodiment, the perforations 46 are circular having 4.0 mm diameters. The perforations are situated in closed pack formation, wherein there are lines of perforations parallel to and spaced from the center lines 36; and there are lines of perforations parallel to and spaced from the longitudinal edges 40 and 42. Each center of perforations 46 is spaced (e) 9.95 mm from its adjacent center along the line parallel to the longitudinal edges 40 and 42. In each line of perforations parallel to the center lines 36, the distance (f) of the center of one perforation to its adjacent center and measured along a line parallel to the leading edge 38 is 2.68 mm. The centers of the first parallel line of perforations 46 are spaced (d) 4.0 mm from the longitudinal edges 40 and 42. In the perforated portion 32, approximately 289 perforations with 4.0 mm diameters can be punched to provide approximately 40% perforations of the surface area.

FIG. 3 shows a finished tube, cut-away, to view the inner layer. The inner layer 10 is helically wound in an edge abutment relation such that one longitudinal edge 20 abuts the other longitudinal edge 22 of the inner sheet to form a ridgeless seam. The sheet is wound about a mandrel at the angle (a) so that the center line 16 is perpendicular to the axial length of the mandrel so that the unperforated portion 14 defines an end of the filter tube.

The outer layer is helically wound in the same manner as the inner layer, i.e., in an edge abutment relation over the inner layer such that one longitudinal edge 40 abuts the other longitudinal edge 42 of the outer sheet 30 to form a ridgeless seam. The outer sheet 30 is wound so that the unperforated portions 34 of the outer sheet 30 align with the unperforated portions 14 of the inner sheet 10 to define ends 24 of the finished filter tube. For added strength of the tube, it is preferred that the ridgeless seam of the outer sheet is offset from the ridgeless seam of the inner sheet.

Although the widths of the inner and outer sheets and the winding angles of the two sheets do not need to be the same, it is advantageous to have the sheets winding at the same angle and at the same speed to minimize stress in the paper material.

During the winding or just prior to winding, the sheets 10 and 30 are subjected to a water mist or a heat lamp to activate the adhesive. After winding, the sheets are cut at the center (cutting) lines 16 and 36 to provide the desired length for the tube.

Figure 4:
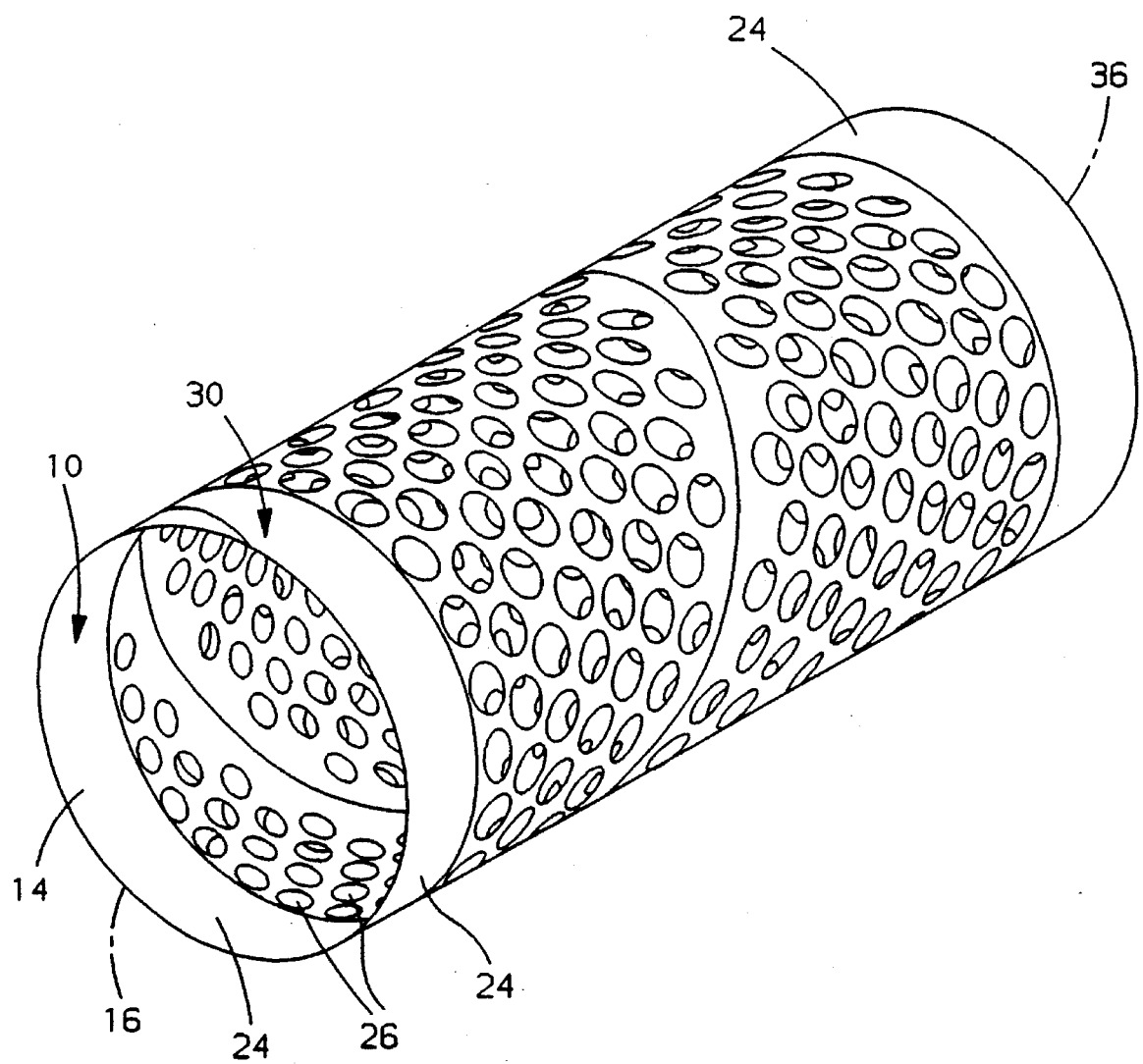
FIG. 4 shows in perspective view, a finished multi-ply tube.

FIG. 4 shows a perspective of the finished helically wound tube. The preferred embodiment provides a tube with approximately 16% perforations for radial flow of fluid through the tube. For use in an oil filtering device for a vehicle, the invention provides an inner support tube. It maintains an outer filter medium, such as a folded paper pack within a housing, and prevents the filter medium from collapsing due to high differential pressures. Dimensions may be changed to accommodate other uses.

The embodiment of the invention in which an exclusive property or privilege is claimed is defined as follows:

1. A helically wound tube having a predetermined axial length comprising:
    an inner ply of flat roll material with a portion of the material having a plurality of perforations and a portion of the material unperforated, and said unperforated portion having a center line,
    wherein said inner ply is helically wound at a winding angle to form a continuous tube such that the center line is perpendicular to the axial length of the tube,
    an outer ply of flat roll material with a portion of the material having a plurality of perforations and a portion of the material unperforated,
    wherein said outer ply is helically wound at a winding angle and overlaps the inner ply, wherein the unperforated portion of the outer ply aligns with the unperforated portion of the inner ply to define ends of the tube spaced from each other by the predetermined axial length, and some of the outer ply perforations overlap some of the inner ply perforations to permit radial flow through the tube.

2. A helically wound tube having a predetermined axial length comprising:
    an inner ply of flat roll material with a portion of the material having a plurality of curve-edged perforations and a portion of the material unperforated, said unperforated portion having a center line, and said flat roll material having a leading edge and two longitudinal edges,
    wherein said inner ply is helically wound in an edge abutment relation such that one longitudinal edge abuts the other longitudinal edge of the material to provide a ridgeless surface, and forms a continuous tube such that the center line is perpendicular to the axial length of the tube,
    an outer ply of flat roll material with a portion of the material having a plurality of curve-edged perforations and a portion of the material unperforated, said outer ply having a leading edge and two longitudinal edges,
    wherein said outer ply is helically wound in an edge abutment relation such that one longitudinal edge of the outer ply abuts the other longitudinal edge of the outer ply to provide a ridgeless surface, and
    said outer ply overlaps the inner ply, wherein the unperforated portion of the outer ply aligns with the unperforated portion of the inner ply to define ends of the tube spaced from each other by the predetermined axial length, and some of the perforations of the outer ply overlap some of the perforations of the inner ply to permit radial flow through the tube.

3. A helically wound tube as recited in claim 2 wherein the flat roll material is a paper material.

4. A helically wound tube as recited in claim 3 wherein the perforated portions of the inner and outer plies are 30–40% perforated to yield a cylindrical tube having 9–16% area perforations.

5. A method of fabricating a tube, said method comprising the steps of:
    perforating a first sheet of card stock material with a plurality of perforations, said sheet having a leading edge and two longitudinal edges,
    perforating a second sheet of card stock material with a plurality of perforations, said second sheet having a leading edge and two longitudinal edges,
    helically winding at a predetermined angle the first sheet in an edge abutment relation such that one longitudinal edge abuts the other longitudinal edge of the first sheet, said first sheet forming an inner layer,
    helically winding the second sheet at a second predetermined angle in an edge abutment relation such that one longitudinal edge of the second sheet abuts the other longitudinal edge of the second sheet, thereby overlapping some of the perforations on the first sheet with some of the perforations on the second sheet,
    and cutting the tube at a predetermined axial length,
    thereby defining a reinforced cylindrical tube wherein the overlapped perforations permit radial flow through the cylindrical tube.

6. The method as defined in claim 5 wherein the winding angle of the first sheet is equal to the winding angle of the second sheet.

7. A method of fabricating a tube, said method comprising the steps of:
    perforating a portion of a first sheet of card stock material with a plurality of curved-edged perforations and leaving another portion of the first sheet unperforated, said first sheet having a leading edge and two longitudinal edges,
    perforating a portion of a second sheet of card stock material with a plurality of curved-edged perforations and leaving another portion of the second sheet unperforated, said second sheet having a leading edge and two longitudinal edges,
    helically winding at a predetermined angle the first sheet in an edge abutment relation such that one longitudinal edge abuts the other longitudinal edge of the first sheet, said first sheet forming an inner layer,
    aligning the unperforated portions of the two sheets while helically winding the second sheet over the inner sheet, in an edge abutment relation such that one longitudinal edge of the second sheet abuts the other longitudinal edge of the second sheet, thereby overlapping the unperforated portions of the two sheets and overlapping some of the perforations of the first sheet with some of the perforations of the second sheet,
    and cutting the tube at a predetermined axial length,
    thereby defining a reinforced cylindrical tube wherein the unperforated portions define ends of the tube, and the overlapped perforations permit radial flow through the cylindrical tube.

8. The method of fabricating a tube, as defined in claim 7, said method comprising the further steps of:
    treating a pair of sheets of card stock material with a resin,
    and applying an adhesive to the sheets,
    wherein the step of perforating a portion of a first sheet and leaving another portion of the first sheet unperforated is performed so that 30–40% of the perforated portion contains holes,
    wherein the step of perforating a portion of the second sheet with a plurality of perforations and leaving another portion of the second sheet unperforated is performed so that 30–40% of the perforated portion contains holes,
    wherein the step of helically winding the second sheet over the inner layer is performed so that 9–16% of the perforations provide radial flow,
    and wherein said method comprises the additional steps of activating the adhesive,
    and heating the tube in an oven to activate the resin.

* * * * *